March 4, 1947. Y. R. CORNELIUS 2,416,908
HEAT TREATING FURNACE
Filed May 1, 1943 4 Sheets-Sheet 1

YNGVE R. CORNELIUS
INVENTOR

BY *E. U. Buckhorn*
ATTORNEY

March 4, 1947.   Y. R. CORNELIUS   2,416,908
HEAT TREATING FURNACE
Filed May 1, 1943   4 Sheets-Sheet 2

YNGVE R. CORNELIUS
INVENTOR

ATTORNEY

March 4, 1947.  Y. R. CORNELIUS  2,416,908

HEAT TREATING FURNACE

Filed May 1, 1943  4 Sheets-Sheet 3

YNGVE R. CORNELIUS
INVENTOR

BY
ATTORNEY

March 4, 1947.    Y. R. CORNELIUS    2,416,908
HEAT TREATING FURNACE
Filed May 1, 1943    4 Sheets-Sheet 4

YNGVE R. CORNELIUS
INVENTOR

BY
ATTORNEY

Patented Mar. 4, 1947

2,416,908

UNITED STATES PATENT OFFICE 2,416,908

HEAT-TREATING FURNACE

Yngve R. Cornelius, Portland, Oreg.

Application May 1, 1943, Serial No. 485,304

12 Claims. (Cl. 263—41)

The present invention relates to heat treating furnaces and, more particularly, to those of the type which are suitable for calcining of limestone, reduction, roasting and sintering of various ores, reduction of calcium sulphate, treatment of clays and the like processes.

In heat treating various granular raw materials, such as ores, it is desirable to spread the raw material in a relatively thin layer upon a hearth surface in order that in the treating process certain gases may escape readily therefrom or be acted upon by either reducing or oxidizing gases, as the case might be, which are circulated thereabove. Certain types of furnaces have been proposed in which the raw material is fed upon one end of an elongated hearth and caused to travel therealong in a relatively thin layer either by mechanical vibration of the hearth or by giving the hearth such an angle of slope so as to permit the ore to move therealong under force of gravity. In other embodiments, as in the case of a rotary kiln, the hearth is made of cylindrical configuration and tilted at an angle so that as it is rotated the ore moves progressively from the upper to the lower end. Such types of furnaces are restricted in their use to treatment of a limited class of materials and, moreover, are relatively complicated in design and difficult and expensive to maintain. Furthermore, all of the above types of heat treating furnaces have one very undesirable feature in common, namely, that in the operation thereof the mixed charge is segregated. The components of the charge usually have widely differing values of specific gravity and any movement as by vibration, rotation or on an inclined surface by gravity will result in segregation of the materials, which, in turn, retards the process or, in many cases, interrupts the process entirely.

It is an object of the present invention to provide a new and improved furnace which is particularly suitable for heat treating granular raw materials in relatively thin layers economically and efficiently.

A further object of the invention is to provide a furnace having a flat hearth of relatively large surface area with a new and improved arrangement for feeding the raw material onto one end of the hearth and for spreading and removing successive batches of the material relative to the hearth surface.

A more specific object of the invention is to provide a heat treating furnace having preliminary and final heat treating chambers, the final treating chamber having a stationary hearth therein, and means for transferring successive batches of mixed raw material from the preliminary heat treating chamber to the final heat treating chamber and for spreading such batches over the surface of the hearth, without resulting in substantial segregation of the components of the mixed charge.

In accordance with one form of the invention a furnace is provided which includes a heating chamber having arranged in the lower portion thereof a receptacle containing a molten bath of a material having a suitable electrical conductivity serving as a source of heat. The molten condition of the bath is maintained by electric current passed therethrough, the processing temperature for the furnace being controlled by regulation of the current flow. A relatively large rectangular plate is supported by the furnace walls above the source of heat forming a hearth surface upon which the raw material to be heat processed is spread. A spreader is slidably mounted upon the upper surface of the hearth and is adapted to be reciprocated longitudinally of the hearth by suitable operating means connected thereto. The spreader is adapted to be filled by successive batches of raw material fed thereinto through a charging port extending through the roof of the furnace at one end thereof. The spreader is so constructed that the contents thereof can be spread over the hearth surface in a layer of a desired depth of substantially uniform thickness. Before spreading each successive batch of raw material over the hearth the previously laid layer which has been treated for a sufficient length of time for conversion into the final product is first scraped from the hearth surface and deposited in a discharge chamber at one end of the furnace.

For a consideration of what is believed novel and inventive the attention is directed to the following description taken in connection with the accompanying drawings while the features of novelty will be pointed out with greater particularity in the appended claims.

The features of the present invention will be described as embodied in a complete furnace structure, particularly adapted for heat treating oxide ores, such as reducing iron ore to metallic sponge iron. While the present invention will be described in connection with such a particular embodiment thereof, it will readily be understood by those skilled in the art that it is not necessarily so limited in that it may be used in furnaces more particularly adapted for heat treating various other ores or raw material.

Referring to the drawings, the furnace is of a generally rectangular construction and is comprised of a bottom wall 12, opposite side walls 13 and 14, and end walls 15 and 16, of a suitable refractory material defining a heating chamber 17. These walls are surrounded by a metal casing 19 with spaces being provided therebetween which are filled with sand in order to improve the thermal efficiency of the furnace structure.

Figure 2:
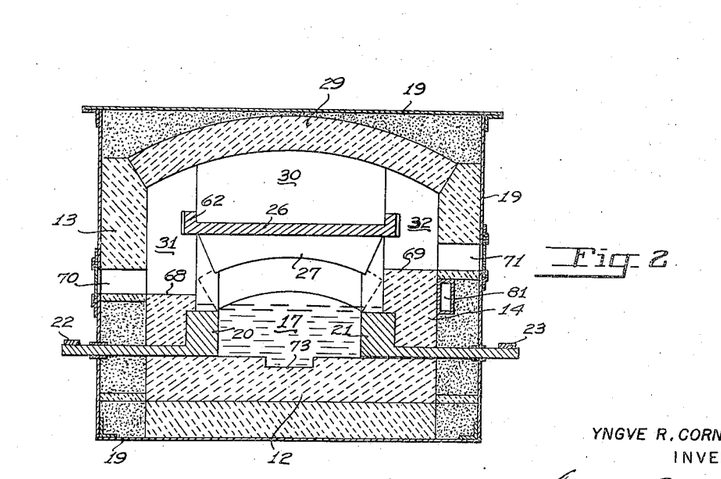
Fig. 2 is a transverse sectional view taken along the line 2—2 of Fig. 1.
Figure 3:
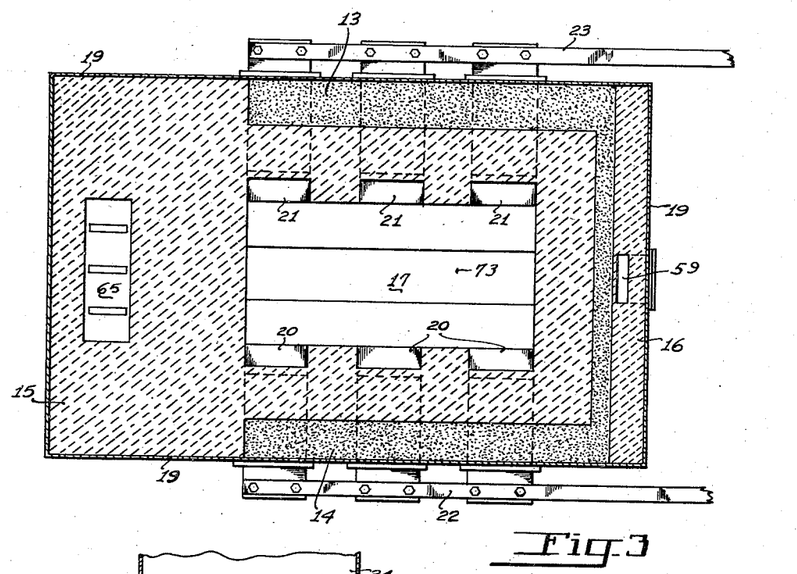
Fig. 3 is a longitudinal, horizontal sectional view taken along the line 3—3 of Fig. 1.
Figure 4:
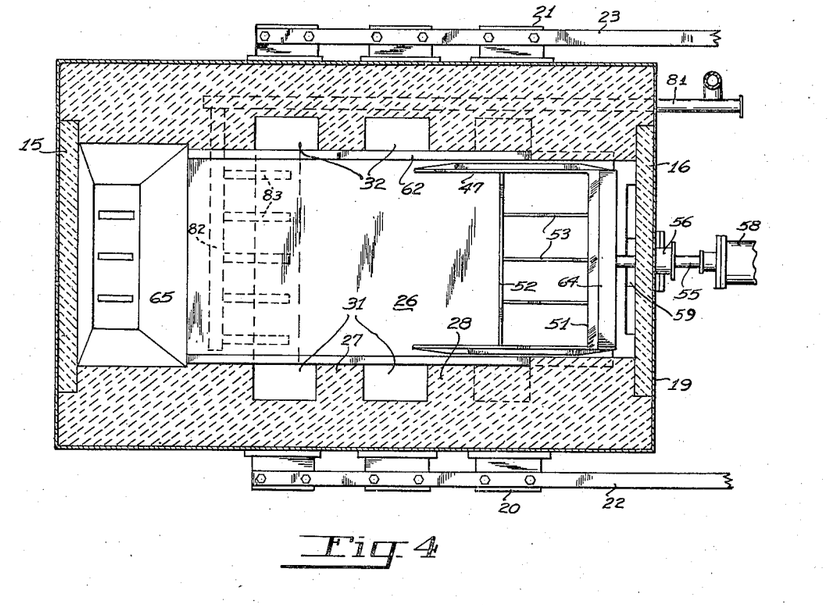
Fig. 4 is a longitudinal horizontal cross-sectional view taken along the line 4—4 of Fig. 1.
Figure 5:
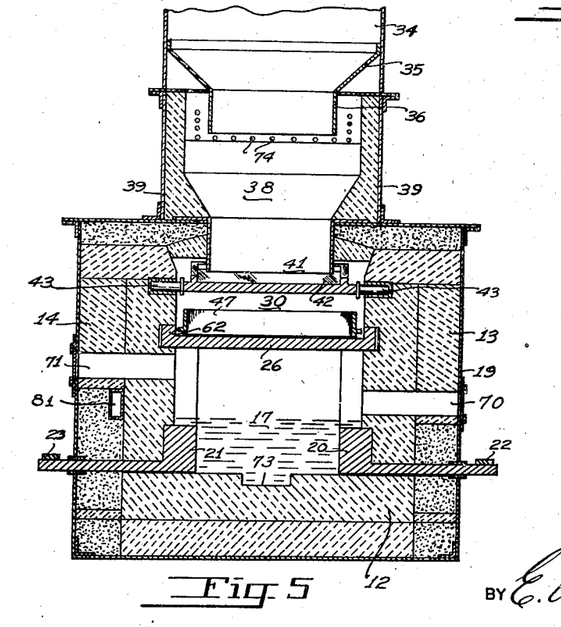
Fig. 5 is a vertical cross-sectional view taken along the line 5—5 of Fig. 1.
Figure 6:
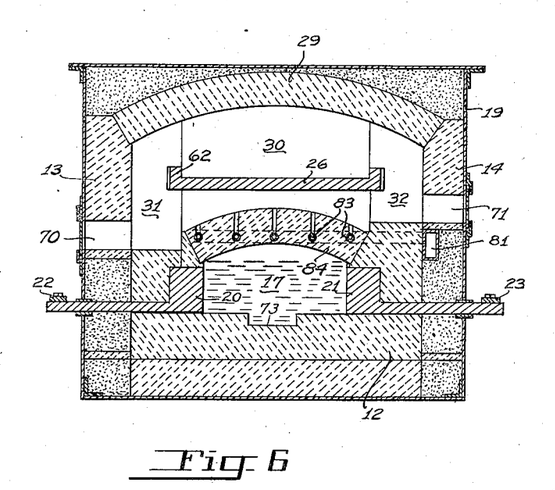
Fig. 6 is a vertical cross sectional view taken along the line 6—6 of Fig. 1.

The furnace is adapted to be electrically heated by current passed through a molten bath of material having a suitable electrical conductivity provided between suitably spaced electrodes arranged in the side walls 13 and 14. For sake of greater clarity in the drawings, the molten bath material has been shown only in the views of Figs. 2, 5 and 6. The bottom wall 12, the side walls 13—14 and the end walls 15—16 define a rectangular receptacle in the lower portion of the heating chamber for containing the molten mass while a plurality of spaced electrodes 20 and 21 are provided in each of the opposite side walls 13 and 14. The electrodes 20 and 21 are preferably formed of iron and present relatively large surface areas toward the interior of the chamber 17 so that the current density, that is, the load current per unit of electrode area in contact with the bath, will be sufficiently low to prevent melting thereof. The electrodes, furthermore, have a relatively large mass in order that the heat will readily be conducted away from the face surfaces in contact with the molten mass and thus prevent substantial deterioration of the electrodes during operation of the furnace and resultant contamination of the bath material. In the illustrated embodiment, the electrodes are of rectangular configuration and rest upon the bottom wall 12. They are provided with integral rearward extensions of reduced thickness which project through the opposite side walls and through insulating bushings in the shell 19, providing connection terminals for the electrodes which may be connected to bus bars 22 and 23. In the presently described embodiment the electrode arrangement is suitable for single phase operation, but it will be obvious that they may be otherwise arranged for three-phase or multi-phase electric current operation. The resistor material between the electrodes 20 and 21 may be silicate slag, sodium silicate, sodium aluminate, glass, or the like, which in the molten state is electrically conductive and forms a substantially indestructible heating element. The depth of the molten mass is preferably such that the electrodes are completely covered.

Suitable means are provided defining a hearth surface above the heating chamber 17 upon which the raw material to be heat treated is spread and rendered into the final product. In this instance, the hearth surface is formed by a relatively large rectangular, cast nickel-iron plate 26 which is supported at its opposite ends upon the top of the end walls 15 and 16 while its opposite side edges rest upon ledges formed in the side walls 13 and 14. The mid-section of the hearth plate 26 is supported by a pair of transversely extending arches 27 and 28 anchored at their opposite ends in the side walls. The underneath surface areas of the hearth plate not resting upon the walls 13—16, or the arches 27, 28, are exposed to heating by radiation from the surface of the molten bath therebeneath. It will be observed that the plate 26 is relatively thick so that the heat will distribute substantially uniformly therethrough and accumulate such a quantity of heat that newly spread charges are rapidly heated thereby to processing temperature.

The roof 29 of the furnace is of an arch type construction and is relatively closely adjacent the upper surface of the hearth plate 26 as shown more clearly in the transverse cross-sectional views, and defines a treating zone 30 above the hearth plate 26. A number of passages indicated at 31 and 32 are formed in the opposite side walls 13 and 14 between the arches 27 and 28 and between arch 27 and the end wall 15, which extend around the edges of the plate 26 permitting the circulation of convection heat currents from the heating bath around the opposite side edges of the hearth plate 26 into the treating zone 30. The heat rising from the chamber 17 heats the arch roof 29 and which, in turn, radiates the heat downwardly toward the hearth surface. The hearth 26 is thus heated from both below and above.

Figure 1:
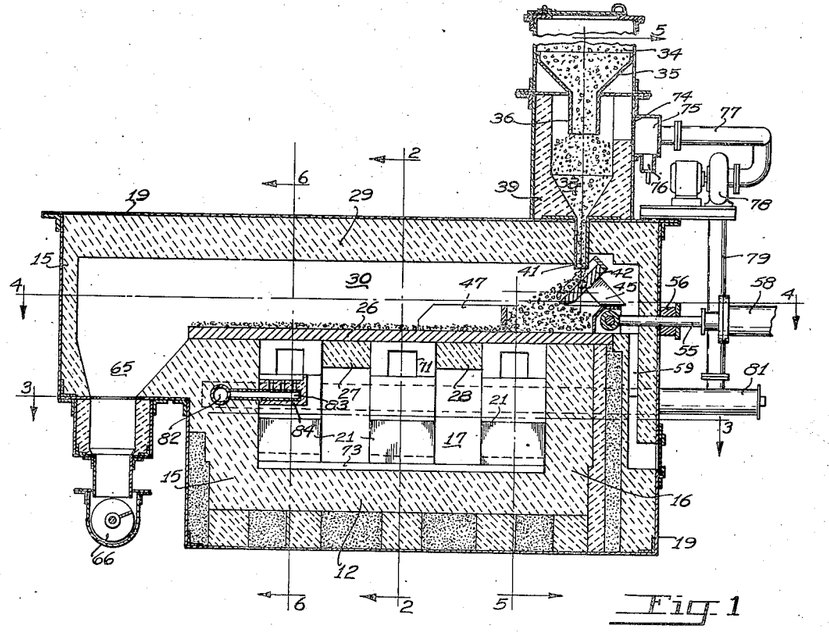
Fig. 1 is a longitudinal, vertical cross-sectional view of the furnace.

Raw material or ore is fed into the treating zone 30 through the hopper 34 which is shown arranged above the left end of the furnace, as viewed in Fig. 1. The hopper in this instance comprises a rectangular bin having inwardly sloping bottom plates 35 converging toward an elongated spout 36. The spout 36 projects downwardly and empties into a preheating chamber 38 defined by a refractory lined rectangular casing 39. The bottom wall of the refractory lining is tapered inwardly toward the edges of the charging port 41 extending downwardly through the arch roof 29 of the furnace over the end of the hearth plate 26. The charging port 41 is relatively narrow and elongate in horizontal cross-section and extends transversely of the furnace.

The flow of material from the lower end of the charging port 41 is controlled by a pivoted gate 42 supported by trunnions 43 (see Fig. 5) rotatably mounted in suitable sockets arranged in the opposite side walls of the furnace structure beneath the charging port. The gate 42 is a relatively heavy iron member and the axis of the trunnions 43 is slightly forward of the center of gravity so that the gate is biased by its own weight in a clockwise direction of rotation, as viewed in Fig. 1, to the port closed position. In the port closed position the gate 42 will prevent flow of raw material from port 41, but is still spaced somewhat therefrom for reasons to be explained later. The gate is provided with a depending arm portion 45 which is adapted to be engaged by the ore spreader 47 in its retracted position and moved thereby to the tilted position as shown in Fig. 1.

The ore spreader 47, comprises a rigid, single piece rectangular frame defining a bottomless compartment having a width corresponding substantially to that of the hearth plate 26. As shown more clearly in the perspective view of Fig. 7, the spreader includes a pair of opposite side walls 48, 49 and an end wall 51 and a forward wall 52 extending transversely intermediate the ends of the side walls. A plurality of stiffener ribs 53 extend between the rear and forward walls. The lower edge of the forward wall 52 is spaced a slight distance 50 above the lower edges of the side walls 48, 49 for reasons to be explained.

The spreader 47 rests directly upon the upper surface of the hearth plate 26 and is adapted to be moved longitudinally thereupon by a tubular actuating arm 55 loosely connected to the rear end of the spreader and which extends through a cooperating opening provided in the rear wall of the furnace in a plane substantially parallel with that of the hearth 26. A suitable bushing 56 mounted on the exterior of the furnace casing is provided around the arm 55 for substantially sealing the opening through the furnace wall about the arm. Any suitable motor means may be connected to the arm 55 for reciprocating the spreader, such as the hydraulic cylinder 58, in which case the arm 55 comprises a plunger which is connected to the piston within the cylinder.

It will be observed that the opposite sides of the hearth plate 26 are provided with upstanding edge portions 62 which guide the movement of the spreader 47 upon the hearth surface. The width of the spreader is preferably slightly less than the width of the hearth plate between the upstanding edge portions 62 in order that no binding will occur therebetween upon movement of the spreader. The side walls 49 of the spreader are preferably provided with longitudinal ribs 63 which will engage with the adjacent surfaces of the hearth edge portions, if at all, so that the spreader will not become fouled by material which might become lodged between the spreader and the hearth plate edges.

When the spreader is in the fully retracted position, as shown in Fig. 1, the rear wall portion 64 thereof engages with the depending arm 45 of the gate 42 to rock it about its trunnions to the tilted position as shown permitting flow of material from the preheating chamber 38 downwardly into the bottomless compartment of the spreader defined by the walls 48—52. As the compartment of the spreader becomes filled, the material will be backed up along the sloping surface of the gate and effectively prevent further flow from the discharge port 41.

Figures 7, 8:
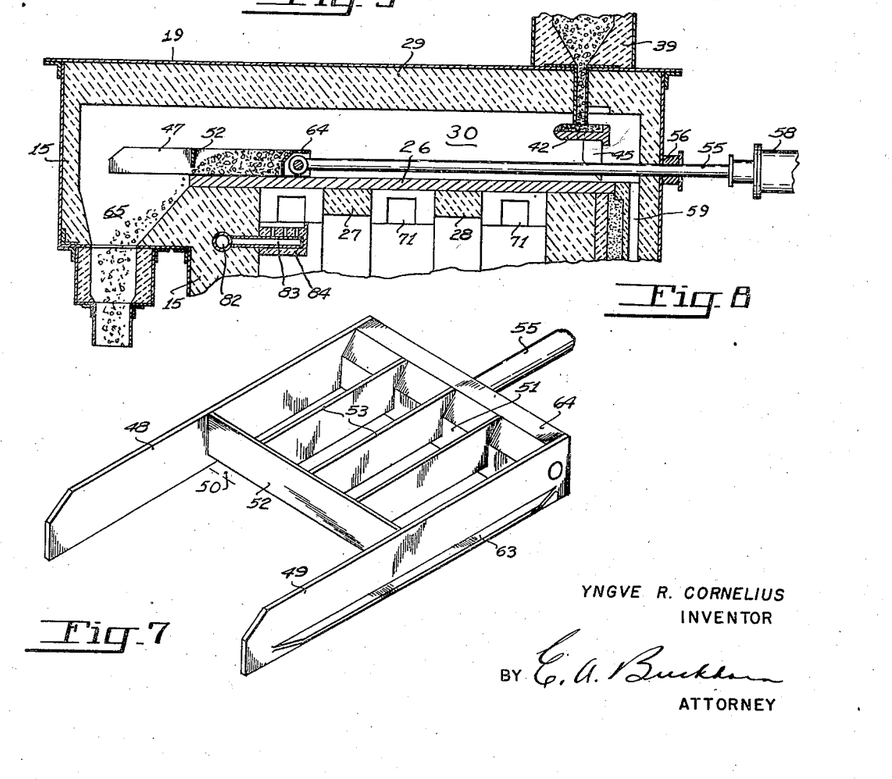
Fig. 7 is a view in perspective of the spreader device incorporated in the furnace shown in Fig. 1 and illustrating in greater detail certain features thereof.
Fig. 8 is a fragmentary view corresponding to Fig. 7, but illustrating the raw material spreader in a second limit position.

By operation of the hydraulic cylinder 58 the spreader is first pushed to the forward end of the hearth plate 26 as shown in Fig. 8 in which position the transverse wall 52 of the spreader is just slightly back from the end of the hearth plate 26. The piston of the hydraulic cylinder is then reversed and the spreader returned to its initial position at the rear end of the hearth plate during which movement the batch contained in the compartment is spread out in a layer of substantially uniform depth over the surface of the hearth plate depending upon the spacing between the lowermost edge of the forward wall 45 of the spreader and the upper surface of the hearth plate.

Accumulation of material at the rearmost end of the hearth plate, behind the spreader 47, is prevented by the provision of a slot 59 communicating with a clean-out recess in the rear wall 16 of the furnace.

As the spreader is moved forwardly upon the hearth plate the gate 38 rocks under its own weight to a horizontal position as shown in Fig. 8, effectively shutting off the flow of raw material into the furnace. After the batch has been emptied from the spreader compartment in the manner described, and the spreader returned to its initial position underneath the charging port, the gate 42 is rocked to the open position and the compartment is again refilled.

After a predetermined period of time, depending upon the particular material being subjected to heat treatment upon the hearth 26, the actuating means 58 is again energized and the spreader again pushed forward upon the hearth 26. The previously spread layer of material is pushed forwardly ahead of the spreader and off of the forward edge of the hearth plate 26 and into the discharge hopper 65 formed in the foremost end of the furnace. A suitable conveyor 66 may be provided beneath the hopper 65 for receiving the material discharged from the hearth and transporting it therefrom. It will be obvious that in the forward movement of the spreader 47 the batch of raw material filling the compartment thereof will effectively seal the space 50 beneath the lower edge of the transverse wall 52 so that the material will be effectively scraped from the hearth surface as the spreader is moved to the forward end of the hearth.

The side walls 48, 49 of the spreader extending forwardly from the wall 52 will prevent the material being scraped up from wedging between the sides of the spreader and the upstanding side edges 62 of the hearth plate, and also prevent the material from being forced up over the side edges of the hearth plate and spilled through passages 31, 32 down into the molten bath of the heating chamber. Due to some abnormal condition of operation of the spreader mechanism it may be possible for some of the material to be forced over the edge portions 62 of the hearth and drop down through the passages 31 and 32 into the heating chamber. Any such material will drop onto the ledges 68, 69 (see Fig. 2) formed in the side walls 13, 14 and may readily be cleaned therefrom through the horizontal clean-out tunnels 70, 71 extending to the outer shell and to which access may be had through removable cover plates. It will be understood that if material of high electrical conductivity should fall down into the molten bath in considerable quantity a short circuit might be formed thereby between a pair of opposite electrodes. In order to minimize the possibility for such a short circuit being formed, a trough 73 is provided in the bottom of the bath basin extending the full length thereof. Thus even though a layer of metallic material should settle across the bottom of the basin, the continuity thereof will be broken by the side walls of the trough 73.

In the event the furnace is to be used for reducing oxide ores, such as iron ore, as previously mentioned, a reducing atmosphere, such as carbon monoxide, is required to be circulated in contacting relation with the layer of ore spread upon the hearth 26. In the furnace of the present invention, such reducing atmosphere is circulated in a closed system, that is, after it has picked up the oxygen from the ore, it is passed through a regenerator and then circulated in contact with the ore again. The oxidized gas is withdrawn from the furnace above the surface of the raw material contained within the preheating chamber 38. It will be observed that the spout 36 of bin 34 depends downwardly into the upper end of chamber 38 so that a free space exists about the spout 36 above the surface of the raw material discharged therefrom. The gases escape from this space through the perforations 74 in the upper portion of the forward wall of the preheating chamber 38 and pass into an elongated box 75, extending transversely of the furnace, within which water vapor entrained with the gas condenses. The condensate is drained off through the sump 76. Communicating with the box 75 is a conduit 77 through which the gases are withdrawn by the suction of a blower 78 which blower in turn forces the gases through duct 79 into the end of the duct 81 extending through the rear wall of the furnace. The duct 81 runs longitudinally of the furnace immediately behind the refractory liner forming the side wall 14 to a point opposite the forward wall 15. Communicating with the forward end of the duct 81 is a transversely extending header pipe 82, see Fig. 8, which extends through the forward wall 15 throughout substantially the full width of the furnace heating chamber. A plurality of passages 83 communicating with corresponding openings provided in the pipe 82 extend rearwardly through the wall 15 and into an arch 84 extending transversely of the heating chamber beneath the hearthplate 26. A plurality of relatively small holes extend upwardly from each of the respective passages 83 through the upper surface of the arch. A bed of carbonaceous material, such as charcoal or coke (not shown), is to be provided upon the upper surface of the arch 84 and through which the gas is forced.

The gas in flowing through the duct 81 lengthwise of the furnace and closely adjacent the highly heated refractory liner of the bath chamber is heated and as it is distributed from the header 82 into a relatively large number of small passages provided in the arch 84 which is closely adjacent the upper surface of the molten bath it is elevated to a still higher temperature corresponding substantially with that prevailing within the heating chamber. In filtering upwardly through the carbonaceous bed on the arch 84 the carbon dioxide content of the gas is reduced to carbon monoxide, and which passes upwardly through the passages 31, 32 around the opposite edges of the hearth plate 26 and over the layer of ore spread out upon the upper surface of the hearth.

The arch 84 provided within the heating chamber 17 beneath the hearth plate 26 and covered with carbonaceous material serves as a gas regenerator. The supply of carbonaceous material upon the arch 84 may be replenished as desired through a pair of tunnels 70, 71 extending transversely through the furnace side walls next adjacent thereto.

Assume that an iron oxide ore such as hematite, $Fe_2O_3$, is to be reduced to metallic sponge iron with carbon monoxide as a reducing agent. It is now generally recognized that the reduction of hematite proceeds stepwise, first to magnetite, $Fe_3O_4$, thence to ferrous oxide, FeO, and finally to metallic iron, Fe. The first two stages of reduction can be effected at lower temperature and with a lower concentration of carbon monoxide in the reducing gas than are required for effecting the final stage of the reduction process. The furnace described is particularly suitable for effecting such stepwise reduction processes in that the final stage may be carried out upon the hearth surface in the zone 30, while the preliminary stages may be carried out in the chamber 38.

The ore, first ground to a suitable fineness, may be mixed with appropriate quantities of pulverized limestone and coke or charcoal and fed into the hopper 34 from which it will flow into the preliminary reduction chamber 38. The highly heated gas withdrawn from the final reduction zone 30 up through the charging port 41 by reason of the reduced pressure created above the surface of the material in the chamber 38 by the blower will effect substantial heating of the raw material therein. Carbon dioxide will be formed from the limestone, and which in turn will be reduced to carbon monoxide upon contact with the heated carbon included in the mixture. The carbon monoxide concentration and the degree of heating of the ore will be sufficient for causing a preliminary reduction of the hematite to ferrous oxide, FeO, before it is introduced into the final reduction zone and during the time that a preceding batch spread upon the hearth surface is being reduced through the final stage from FeO to metallic Fe.

The gas withdrawn from the preliminary reduction chamber 38 is returned to the furnace through duct 81 and in passing through the incandescent carbon upon the arch 84 will be reduced substantially entirely to carbon monoxide. The electrically heated molten bath being non-gaseous does not oxidize or otherwise dilute the reducing gas and, accordingly, the gas may be circulated in direct contact with the upper surface of the bath and in flowing upwardly around the sides of the hearth plate through passages 31, 32 will carry heat with it to the treating zone 30 thereabove. Above the hearth, the reducing gas will effect complete reduction of the oxide to metal. By a continuous circulation of the gas, a high concentration of carbon monoxide may be maintained in the final reduction chamber so that the processing period can be shortened to the minimum.

It will be observed that the charging port 41 communicating between the chambers 38 and 30 is relatively narrow and long so that the gas being drawn from the chamber 30 upwardly into the chamber 38 will be distributed over a relatively large area. The paths of least resistance for the gas flow upwardly through the charging port 41, which is filled with a column of descending material, will lie next to the surface of the walls defining the charging port rather than up through the central portion of the column of material. By reducing the cross sectional thickness of the column and by increasing the width of the wall area the ascending gas will be distributed so as to come in contact with a greater number individual particles of the ore. At the top of the charging port the gas will tend to diffuse with substantially uniform distribution throughout the greater mass in the chamber 38. With the charging port and the preliminary reduction chamber of this construction a high degree of reduction, at least through the preliminary steps of the process, can be obtained in the chamber 38. An additional advantage derived from effecting partial reduction of the ore in a preliminary reduction chamber resides in the fact that it is relatively simple thus to maintain the high concentration of carbon monoxide in the gas in the final reduction chamber which is necessary to effect complete reduction therein.

A further important feature of the furnace of the present invention consists in the arrangement whereby the ore, partially reduced in the preliminary reduction chamber, is deposited upon one end of the hearth surface immediately adjacent the charging end where it remains throughout the period that the previously spread layer of ore is undergoing final reduction. The incoming batch of ore fed into the compartment of the spreader 47 is initially of a relatively low temperature and, if immediately spread over the hearth surface, would tend to chill it, but, inasmuch as the spreader is retained in the retracted position throughout the full period of time that the previous batch is undergoing final reduction, it is heated to a temperature corresponding substantially to that prevailing over the hearth surface. Spreading of each successive batch, which has been thus preheated, results in only a very slight drop in furnace temperature so that a high rate of production may be maintained. It is preferred that the compartment in the spreader 47 have a capacity corresponding substantially to two or more layers over the hearth so that the newly added charge will remain in the spreader for such a period as is required for it to reach a temperature as close to the processing temperature as possible.

By means of the novel arrangement herein provided for spreading the successive batches of material to be heat processed over the hearth surface and for positively removing the batches from the hearth surface upon completion of the processing the maintenance expense for the furnace is reduced to a minimum in that it may be operated for long periods of time without requiring reconditioning of the hearth surface or spreader mechanism. The spreader mechanism and charging port closure gate comprise a minimum number of working parts and which, accordingly, may be made of rugged dimensions so as to be substantially indestructible.

Figure 9:
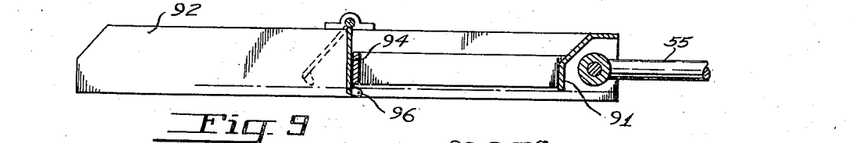
Fig. 9 is a cross-sectional view illustrating a second modification of a spreader device.
Figure 10:
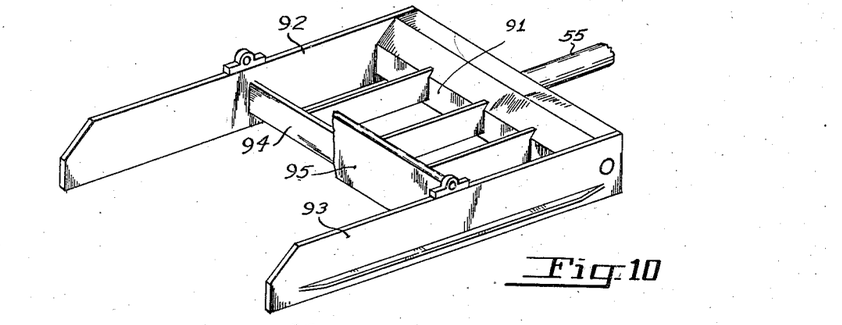
Fig. 10 is a perspective view of the device of Fig. 9.

With the spreader as described above the ore is spread over the hearth surface upon withdrawal of the spreader from a position at the forward end of the hearth surface following scraping of the previously spread layer therefrom. This is accomplished by providing a slight space underneath the forward transverse wall of the spreader unit. In the modification of the spreader device illustrated in Figs. 9 and 10, spreading of the successive batches is accomplished during the forward movement of the spreader unit simultaneously with the scraping of the preceding layer from the hearth surface. In this modification the spreader is substantially similar to that previously described except that the lowermost edge of the rear wall 91 is also spaced somewhat above the lower edges of the side walls 92, 93. Forwardly of the wall 94 is pivotally mounted a flap 95, the lowermost edge of which, in the vertical position depends substantially to the lowermost edge of the side walls 92, 93. With the compartment of this spreader unit filled, as it is advanced forwardly the flap 95 will hang in the vertical position bearing against the wall 94, which acts as a stop, and scrape the previously laid layer from the hearth surface. Simultaneously the contents of the spreader compartment are spread over the hearth surface by escape through the slot under the rear wall 91. Upon the withdrawal of the spreader unit to the rear end of the hearth surface the flap 95 will pivot forwardly, as shown in dotted lines in Fig. 9, to pass over the newly spread layer. In order to insure such forward pivotal movement of the flap 95 it may be desirable to provide one or more lugs 96 extending rearwardly from the lowermost edge of the hinged flap 95 which, upon reverse movement of the spreader unit, will bear against the hearth surface with increased frictional resistance so as forcibly to shift the flap outwardly relative to the wall 94.

A minimum of segregation of the mixed materials forming the charge will take place in the operation of the furnace as described. The material moves with substantially vertical motion down through the hopper and the preliminary heat treating chamber into the spreader compartment. It will be understood by those skilled in the art that materials of mixed grain size and density have a great tendency to segregate when moved over a long sloping surface or when agitated. With the mechanical spreading arrangements disclosed, the successive batches are deposited evenly upon the hearth surface where they remain motionless throughout the ensuing final processing period.

In the case of reduction of iron ore to metallic sponge iron it is obvious that the final product should be cooled either in the lower end of the discharge chamber of the furnace or in the conveyor means out of contact with oxygen so as to prevent the re-oxidation thereof.

Having described the invention in what is considered to be an operative embodiment thereof, it is desired that it be understood that the various specific details shown are merely illustrative and that the invention may be carried out by other means.

I claim:

1. A furnace comprising means defining a heat treating chamber, means defining a stationary hearth surface in said chamber, spreader means slidably supported on said hearth surface, a charging chamber mounted above one end of said chamber, a port communicating between said chambers, a gate for controlling the flow of granular raw material through said port, means for reciprocating said spreader longitudinally of said hearth surface, said spreader engaging with said gate when moved to the corresponding end of said hearth surface and moving it to the open position whereby a batch of ore is discharged into said spreader, said gate moving to the closed position as said spreader is moved away from said port during spreading of the batch contents in said spreader over said hearth surface said gate in the closed position permitting flow of reducing gas from said heat treating chamber to said charging chamber through the material in said port.

2. A furnace comprising a heat treating chamber, means defining a stationary hearth surface in said chamber, spreader means having a bottomless compartment slidably supported on said hearth surface, a charging chamber mounted above one end of said reducing chamber, a port communicating between said chambers, a gate for controlling the flow of successive batches of raw material from said charging chamber through said port into said spreader compartment, said spreader engaging with said gate for moving it to the open position as said compartment is moved into receiving position relative to said port, said gate moving to the closed position as said spreader is moved away from said port for spreading of the batch contents in said compartment over said hearth surface said gate in the closed position permitting flow of reducing gas from said reducing chamber to said charging chamber.

3. A heat treating furnace comprising a reducing chamber, means defining a stationary hearth surface in said chamber, a spreader slidably supported on said hearth surface, a charging chamber mounted above one end of said reducing chamber, a port communicating between said chambers, a gate for controlling the flow of granular raw material through said port, means for reciprocating said spreader longitudinally of said hearth surface, said spreader engaging with said gate when moved to the corresponding end of said hearth surface and moving it to the open position whereby a batch of raw material is discharged into said spreader, said gate moving to the closed position as said spreader is moved away from said port during spreading of the batch contents over said hearth surface, said gate in the closed position permitting flow of reducing gas through said port, means for introducing a reducing gas into said reducing chamber and for withdrawing it therefrom through said charging port into said charging chamber for substantially preheating the ore in said charging chamber prior to the introduction thereof into said reduction chamber.

4. A heat treating furnace comprising a chamber having a stationary flat surfaced hearth substantially horizontally arranged therein, means for heating said chamber including said hearth, a preliminary heat treating chamber arranged above said first chamber, a charging port communicating between said chambers, a hopper for feeding material into said preliminary heat treating chamber, said preliminary heat treating chamber being so arranged with respect to said first chamber that raw material flows by gravity through said charging port, said hopper including means for maintaining a predetermined level of material in said preliminary heat treating chamber, means provided on said hearth for receiving successive batches of raw material from said charging port and depositing said batches in relatively thin layers over said hearth, means for controlling the flow of said raw material through said port, said last mentioned means being actuated automatically by said batch receiving means.

5. A heat treating furnace comprising a chamber, a receptacle in the lower portion of said chamber, a mass of relatively non-oxidizing material in said receptacle maintained in a molten condition, a refractory arch defining the roof of said chamber above said receptacle, a relatively flat stationary hearth means supported between said receptacle and said roof for receiving thereupon a layer of raw material to be heat processed, spaces between the opposite edges of said hearth means and the side walls of said chamber, the material on said hearth means being heated by conduction through said hearth means and by radiation from said roof, means for introducing reducing gas into said chamber over the surface of molten material in said receptacle said gas being heated over said surface and then passing upwardly through said spaces.

6. A heat treating furnace comprising a chamber, a receptacle in the lower portion of said chamber containing a molten mass, hearth means in said chamber above said receptacle and heated by said molten mass, said hearth being adapted to receive successive batches of raw material, means for introducing reducing gas into said chamber comprising a relatively long duct means extending through a wall of said receptacle parallel therewith and having an opening in said receptacle above the level of the molten mass therein, said duct being of such a length that the gas passing therethrough is heated substantially to the temperature prevailing within said chamber before emerging from said opening.

7. A heat treating furnace comprising a final treating chamber, a stationary flat surfaced hearth substantially horizontally arranged in said chamber, means for heating said chamber including said hearth, a preliminary heat treating chamber arranged above said final heat treating chamber, a restricted passage communicating between said chambers, means for controlling the flow of successive batches of raw material from said preliminary heat treating chamber through said passage, means for receiving said successive batches and spreading them over said hearth, means for feeding raw material into said preliminary heat treating chambers and for maintaining a predetermined level of raw material therein, a blower means, the intake of said blower means communicating with said preliminary heat treating chamber above the level of raw material therein whereby gas may be drawn from said final heat treating chamber through said passage and through the raw material contained in said preliminary heat treating chamber.

8. A heat treating furnace comprising a final treating chamber, a hearth arranged in said chamber for receiving granular raw material to be heat treated, heating means for said chamber including said hearth, a preliminary heat treating chamber arranged above said final heat treating chamber, a passage communicating between said chambers, means for feeding raw material into said preliminary heat treating chamber and for maintaining a predetermined level of raw material therein, a blower means, the intake of said blower means communicating with said preliminary heat treating chamber above the level of raw material contained therein whereby gas is drawn from said final heat treating chamber through said passage, said passage being relatively narrow and of a length corresponding substantially to the maximum dimension of the bottom of said preliminary heat treating chamber.

9. A heat treating furnace comprising a final heat treating chamber, a receptacle in the lower portion of said chamber, a mass of relatively non-oxidizing material in said receptacle maintained in a molten condition, hearth means in said chamber fixedly supported above said receptacle for receiving successive charges of raw material, passages in said chamber extending around the opposite sides of said hearth, a preliminary heat treating chamber arranged above said final heat treating chamber, a charging passage communicating between said chambers, means for feeding raw material into said preliminary heat treating chamber, means connected to said preliminary heat treating chamber for withdrawing spent gases from said final heat treating chamber through said charging passage and for regenerating said gases, and means for reintroducing said regenerated gases into said final treating chamber below said hearth means.

10. A heat treating furnace comprising a chamber, a receptacle in the lower portion of said chamber, a molten mass of non-oxidizing material in said receptacle, hearth means in said chamber supported above said receptacle, means for introducing reducing gas into said chamber above the surface of said molten mass below said hearth means and passages for said gas in said chamber extending around the opposite sides of said hearth and means for withdrawing said gas from said chamber above said hearth means.

11. A furnace comprising a heat treating chamber, means defining a relatively large rectangular hearth in said chamber, means for feeding successive batches of raw material into one end of said chamber, means for receiving successive batches of treated material at the opposite end of said chamber, said hearth having upstanding edge portions along each of the opposite sides thereof, a rectangular spreader longitudinally slideable upon said hearth for receiving said batches at said one end of said chamber and for spreading said batches in a relatively thin layer over said hearth and for removing each of said layers from the opposite end of said hearth prior to the spreading of the next succeeding batch thereover, said spreader comprising a pair of opposite side walls, an end wall and a forward wall in a rigid unitary relationship, said forward wall extending between said opposite side walls substantially midway between the opposite ends thereof, the lowermost edge of said forward wall being spaced a slight distance above the lower edge of said opposite side and rear walls, and a plurality of stiffening members extending between said rear and forward walls.

12. A furnace comprising a heat treating chamber, means defining a relatively large rectangular hearth in said chamber, means for feeding successive batches of raw material into one end of said chamber, means for receiving successive batches of treated material at the opposite end of said chamber, said hearth having upstanding edge portions along each of the opposite sides thereof, a rectangular spreader longitudinally slideable upon said hearth for receiving said batches at said one end of said chamber and for spreading said batches in a relatively thin layer over said hearth and for removing each of said layers from the opposite end of said hearth prior to the spreading of the next succeeding batch thereover, said spreader comprising a pair of opposite side walls, an end wall and a forward wall in a rigid unitary relationship, said forward wall extending between said opposite side walls substantially midway between the opposite ends thereof, the lowermost edge of said forward wall being spaced a slight distance above the lower edge of said opposite side and rear walls, a plurality of stiffening members extending between said rear and forward walls, the distance between said opposite side walls being slightly less than the distance between said upstanding hearth edge portions and outwardly extending longitudinal ribs on each of the outer sides of said opposite side walls for slideably engaging said upstanding hearth edge portions.

YNGVE R. CORNELIUS.

REFERENCES CITED

The following references are of record in the file of this patent:

UNITED STATES PATENTS

| Number | Name | Date |
|---|---|---|
| 1,201,664 | Williams | Oct. 17, 1916 |
| 1,557,722 | Pastrnak | Oct. 20, 1925 |
| 1,569,478 | Grant | Jan. 12, 1926 |
| 127,144 | Blair | May 28, 1872 |
| 2,015,642 | Walker | Sept. 24, 1935 |
| 1,798,802 | Niles | Mar. 31, 1931 |
| 127,144 | Blair | May 28, 1872 |
| 1,569,478 | Grant | Jan. 12, 1926 |
| 1,732,672 | Christiansen | Oct. 22, 1929 |
| 1,832,731 | Pardee | Nov. 17, 1931 |
| 2,330,438 | Mann | Sept. 28, 1943 |
| 1,430,971 | Fornander | Oct. 3, 1922 |
| 1,874,417 | Baily | Aug. 30, 1932 |
| 1,997,524 | Kuntziger et al. | Apr. 9, 1935 |
| 669,411 | Guiterman | Mar. 5, 1901 |
| 1,678,876 | Rohn | July 31, 1928 |
| 1,700,002 | Trautman | Jan. 22, 1929 |

FOREIGN PATENTS

| Number | Country | Date |
|---|---|---|
| 409,893 | British | May 10, 1934 |